Oct. 20, 1970
J. A. BRAY ETAL
3,535,162
CLEANSING OF COMPONENTS CONTAMINATED WITH ALKALI METALS
Filed Jan. 27, 1969
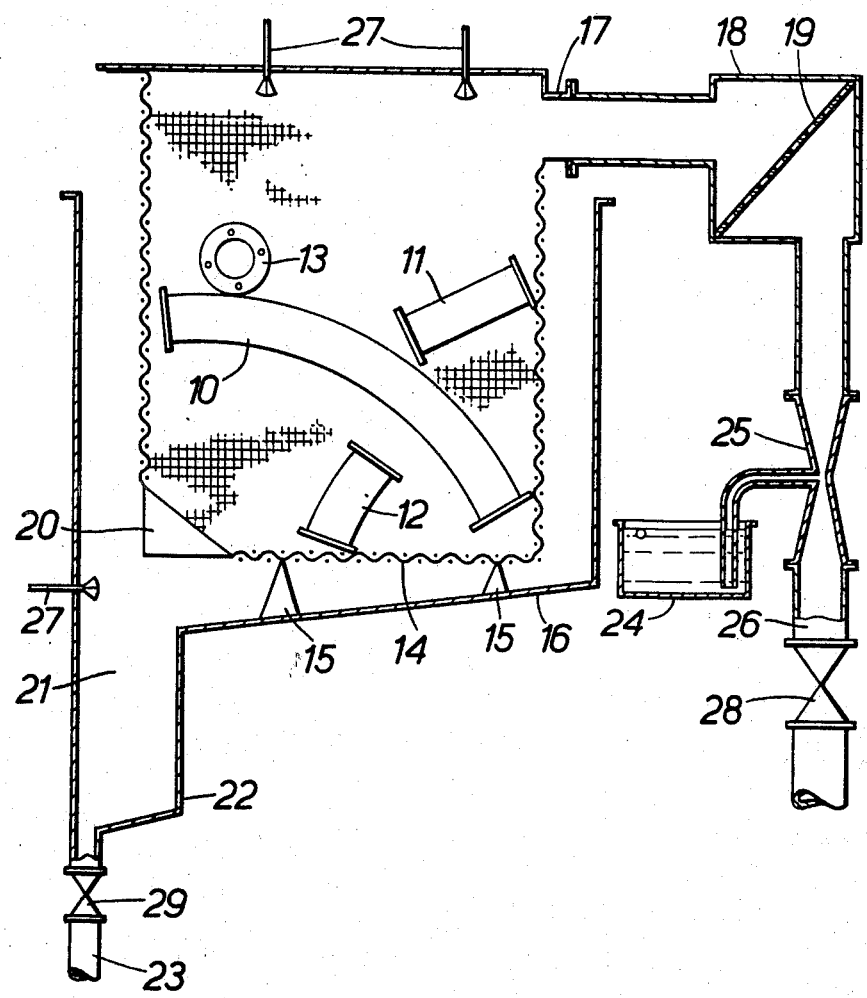

3,535,162
CLEANSING OF COMPONENTS CONTAMINATED WITH ALKALI METALS
John Alan Bray, Thurso, and Ian Mackenzie Donn, Wick, Caithness, Scotland, assignors to United Kingdom Atomic Energy Authority, London, England
Filed Jan. 27, 1969, Ser. No. 793,986
Int. Cl. B08b 7/00
U.S. Cl. 134—42                            1 Claim

ABSTRACT OF THE DISCLOSURE

High expansion foam created with an inert gas such as argon or nitrogen is used as a medium for cleansing components contaminated with highly reactive alkali metals such as sodium.

BACKGROUND OF THE INVENTION

The currently preferred way of cleansing components contaminated with alkali metals is to subject them to steam. This creates an alkali metal/water reaction of acceptable intensity. However, there are difficulties with steaming such as the explosion risk from pockets of water formed by condensation unless the components being cleansed are kept above 100° C. The caustic fumes produced need to be passed through a scrubbing process before venting to atmosphere. Alcohols can be used in lieu of steam but this increases costs and introduces a further fire risk.

SUMMARY OF THE INVENTION

A component contaminated with alkali metal such as sodium or potassium and mixtures thereof, is cleansed by treatment with high expansion foam, the foam reacting in a gentle manner. The foam is generated with an inert gas such as argon or nitrogen. The foam is collected in a suitable location and then allowed to collapse into a drain.

The advantages arising from the invention when compared with prior art processes are:
(a) Low cost.
(b) Low flammability.
(c) Low density of reactant.
(d) Inherent provision for expansion of gases evolved by the reaction.
(e) No need to provide scrubbing plant to clean up fume.
(f) Miscibility with subsequent water washes.

Where potassium is one of the contaminants there is a very low probability of potassium super-oxide explosions.

DESCRIPTION OF THE DRAWING

The drawing is schematic in form and shows the cleaning of pipework contaminated with sodium.

DESCRIPTION OF THE PREFERRED EMBODIMENT

Pipes 10, 11, 12, 13 to be decontaminated are inserted into a small mesh (e.g. ¼–½ in.) wire netting cage 14 supported on stools 15 in a drain pan 16. The cage 14 has an inlet duct 17 for high expansion foam and this is connected to a foam generator 18 having a foam generating screen 19. The cage 14 also has an outlet port 20 which connects with a drain duct 21 which discharges to a sump 22 with take-off pipe 23. The pan 16 also drains to the sump 22.

The foam generator is supplied from a tank 24 filled with a detergent/water mixture such as a 5% solution of sodium lauryl sulphate. This mixture is fed to the foam generator through an injector 25 fed with nitrogen at duct 26. This method ensures that the detergent solution cannot be sprayed directly on to the contaminated articles except as nitrogen filled bubbles.

Foam collapsing sprays 27, which can also serve to provide water washes, are provided in the cage 14 and the duct 21. The cage 14 can be removable or provided with a removable lid. Valves 28, 29 are also provided.

We claim:
1. A process of cleansing components contaminated with alkali metals comprising first, exposing said components to gas filled high expansion foam, the foam being reactive with said metals to remove them and the gas-filling being inert to said metals, and second, washing said components to remove the reaction products.

References Cited
UNITED STATES PATENTS

| | | | |
|---|---|---|---|
| 1,141,243 | 6/1915 | Foster | 134—29 |
| 2,563,151 | 8/1951 | Bjorksten. | |
| 3,037,887 | 6/1962 | Brenner et al. | 134—36 XR |
| 3,078,190 | 2/1963 | Blaser et al. | 134—36 XR |

MORRIS O. WOLK, Primary Examiner
J. T. ZATARGA, Assistant Examiner

U.S. Cl. X.R.
134—29, 36